Oct. 12, 1965

R. L. SHEETZ 3,211,039

POWER PUNCH

Filed Dec. 1, 1961

RICHARD L. SHEETZ
INVENTOR.

BY George C. Thompson &
Don Finkelstein
AGENTS

United States Patent Office 3,211,039

Patented Oct. 12, 1965

3,211,039

POWER PUNCH

Richard L. Sheetz, Manhattan Beach, Calif., assignor, by mesne assignments, to TRW Inc., a corporation of Ohio Filed Dec. 1, 1961, Ser. No. 156,203
2 Claims. (Cl. 83—520)

Figure 1:
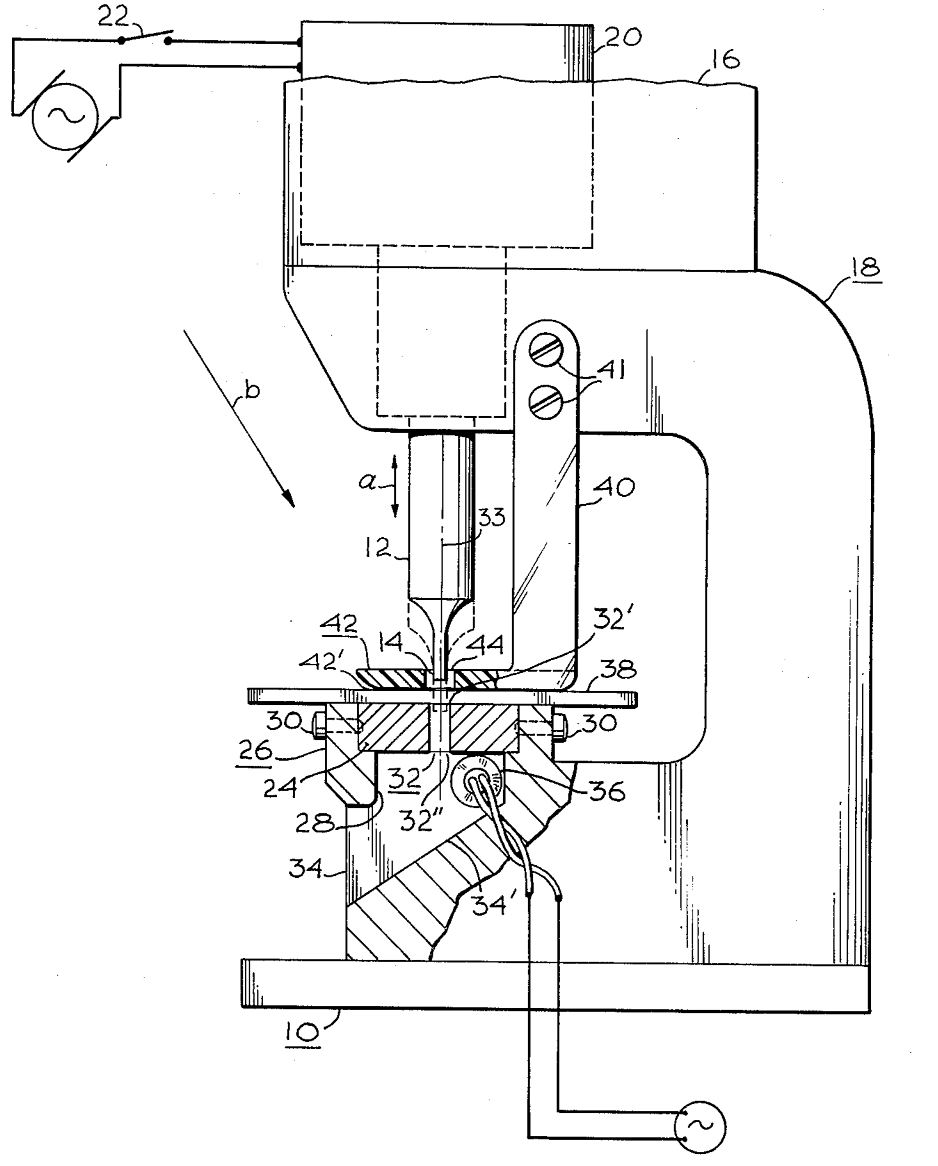

This invention relates to the power punch art and, more particularly, to improved methods of and arrangements for accurately punching a preselected pattern of small holes in a transparent or translucent material.

In many applications, such as welded electronic modules, it is necessary to provide a plurality of small holes in thin wafers made from a transparent or translucent material. The holes are utilized as access for feed-through pins and interconnectors for various electricolor electronic devices encapsulated in the finished module. The required locations for the holes are usually indicated by a preselected pattern reproduced directly on the wafer and the holes may be extremely close together to allow high density packing. Consequently, it is not only necessary that the holes be placed with extreme accuracy but also, because of the thinness of the wafer, means should be included to prevent shifting or lifting of the wafer during the punching operation.

Prior devices utilized to punch holes in such wafers have not always proven completely satisfactory in meeting these requirements. For example, difficulty has been experienced not only in accurately placing the wafer to assure that the holes are punched in the correct locations but also in preventing relative movement of the wafer during the punching operation.

Accordingly, it is an object of this invention to provide an improved power punch device.

It is another object of this invention to provide an improved punch device in which a transparent or translucent wafer may be accurately positioned prior to the punching operation.

It is another object of this invention to provide an improved punch device in which relative movement of the material to be punched is restricted during the punching operation.

The above and other objects are achieved according to this invention by providing in a power-operated punch a reciprocally-operated ram and a prealigned die in which the die has a passage therethrough aligned to receive a cutting head portion of the ram. The axis of the passage and the axis of the cutting head are substantially colinear and the passage is contoured to provide a close fit with the cutting head. The work stock to be punched, which may comprise a thin, translucent or transparent wafer, is placed upon a first surface of the die and is positioned intermediate a first end of the passage and the cutting head. The wafer includes appropriate markings thereon indicating the desired hole pattern.

A source of electromagnetic radiation, such as a light bulb, is positioned adjacent the passage at a second end thereof which is opposite the end into which the cutting head penetrates. A beam of electromagnetic radiation from the source is directed through the passage and impinges upon the wafer and is at least partially transmitted therethrough. The beam of electromagnetic radiation provides a small spot of light directly upon the wafer and the size of the spot is approximately the same size as the passage which is selected to be approximately equivalent to the required hole size.

The wafer is then positioned so that the spot of light coincides with a hole indicating marking on the wafer and the punch is then operated. The cutting head pierces the wafer and enters the die, punching a hole in the wafer at precisely the position indicated by the spot of light. After the punching operation, the cutting head retracts from the die and wafer. The wafer may then be repositioned, as described above, and the punching operation repeated.

The above and other embodiments of this invention are more fully disclosed in the following detailed description with reference to the accompanying drawing wherein similar reference characters refer to similar elements and in which:

FIGURE 1 is a sectional view, partially in schematic, of a power punch according to applicant's invention.

Referring now to FIGURE 1, there is shown a sectional view of a power punch, generally designated 10, according to applicant's invention. A ram 12 having a cutting head portion 14 is mounted on a first portion 16 on a body member 18. The ram 12 is constrained by the mounting on the body member 18 to move reciprocally as indicated by the arrow *a*. The ram 12 has a first position, shown by the solid lines on FIGURE 1, and a second position shown by the dotted lines on FIGURE 1. A solenoid 20 operated through switch 22, which is connected to a source of electrical energy, may be utilized to move the ram 12 from the first position to the second position. When the solenoid 20 is de-energized, for example, when the switch 22 is opened, the ram 12 is in its first position. When the switch 22 is closed, the solenoid 20 is energized and the ram 12 is actuated into the second position.

While a solenoid 20 is shown as the means for actuating the ram 12, it will be appreciated that many other ram actuating arrangements could be utilized. For example, the ram 12 could be actuated by a hydraulic cylinder arrangement, a pneumatic drive, or by a manually operated lever. The particular ram actuation arrangement selected is immaterial to applicant's invention herein; however, for convenience, the embodiment of applicant's invention shown on FIGURE 1 is described as incorporating a solenoid actuation arrangement.

A die 24 is retained in a second portion 26 of the body member 18 on an annular shoulder means 28. A pair of set screws 30 may be provided to retain the die 24 in a predetermined position. The die 24 is provided with a passage 32 which is designed to provide a very close fit to the cutting head portion 14 of the ram 12. The axis 33 of the ram 12 and the passage 32 are substantially coaxial or colinear and, as shown by the dotted lines on FIGURE 1, when the ram 12 is in the second position, it enters the passage 32 through a first end 32' thereof.

The body member 18 has wall portions defining a cavity 34 that communicates with the passage 32 through a second end 32'' thereof. The cavity 34 may also communicate with regions external with body member 18 as shown on FIGURE 1. An inclined wall portion 34' of the cavity 34 is spatially separated from the second end 32'' of the passage 32.

A source, such as a light bulb 36, is positioned in the cavity 34 out of alignment with the passage 32 and oriented to reflect the light from the cavity walls and concentrate this light to direct a beam of light through the passage 32 from the second end 32'' to form a spot of light on the workpiece 38 at the position corresponding to the path of the cutting head 14.

A workpiece 38, having imprinted thereon a predetermined hole pattern, is placed on the die 24 intermediate the cutting head portion 14 of the ram 12 and the passage 32. The workpiece 38 is transparent or translucent and the electromagnetic radiation from the light bulb 36 that is transmitted through the passage 32 impinges thereon and provides a spot of light directly aligned with the first end 32' of the passage 32. The size of the cutting head portion 14 corresponds to the required hole sizes to be made in the workpiece 38.

A stripper 40 is coupled to the body member 18 by screw means 41. The stripper 40 has a portion 42 that is transparent and is positioned closely adjacent or in contiguous spaced relation to the die 24 to provide a small clearance between a lower surface 42' thereof and the die 24. The workpiece 38 fits in this small clearance space intermediate the die 24 and the lower surface 42' of the stripper 40. The stripper 40 is also provided with a clearance hole 44 through which the ram 12 moves during the punching operation.

Applicant has found that the parallax associated with viewing the workpiece 38 from the direction indicated by the arrow *b* has often resulted in inaccurate positioning of the workpiece 38. It is believed that this is caused by the fact that the cutting head portion 14 of the ram 12 must be separated from the first end 32' of the passage 32 when the ram 12 is in the first position in order to allow positioning of the workpiece 38 therebetween. The parallax thus associated with this viewing from the direction indicated by arrow *b*, has, in prior power operated punches, required that the punch be carefully lowered until it is closely adjacent the workpiece 38 or actually touching it and then the workpiece 38 shifted until the proper position indicated by the hole pattern on the workpiece 38 is obtained. This has, in the past, proved very time consuming and not adapted to high speed operation.

Having discovered the problem, applicant's invention described herein uniquely solves this problem and allows rapid positioning of the workpiece 38 without requiring movement of the ram 12. Since the beam of electromagnetic radiation from the light bulb 36 comes through the passage 32, which is prealigned and coaxial with the cutting head portion 14 of the ram 12, the spot of light that appears on the workpiece 38 is exactly at the position corresponding to the path of the cutting head portion 14. Thus, by adjusting the workpiece 38 until the spot of light is coincident with one of the indicated hole positions, the solenoid 20 may be actuated thereby driving the cutting head portion 14 of the ram 12 through the workpiece 38 and thus punching a hole in the workpiece 38 at the desired location. The portion of the workpiece 38 removed by the cutting head portion 14 falls through the passage 32 and into the cavity 34.

The portion 42 of the stripper 40 is preferably transparent so that the hole pattern indications reproduced upon the workpiece 38 may be seen therethrough when viewed from the direction indicated by the arrow *b*. Further, the portion 42 of the stripper 40 provides a guard to prevent, for example, the operator of the power punch 10 from placing a finger in the path of the cutting head portion 14. The close proximity of the lower surface 42' of stripper 40 to the die 24 prevents shifting and movement of the workpiece 38, both during the punching operation and when the ram 12 is retracted to its first position.

In the preferred embodiment of this invention, it is desirable to have the switch 22, which controls the solenoid 20, be foot operated. This permits both hands of the operator to be free in adjusting the workpiece 38 into the desired location for the punching operation.

Those skilled in the art will find many variations and adaptations of applicant's invention. Therefore, the foregoing description of the various embodiments of applicant's invention together with the accompanying drawing are intended to be illustrative and not limiting and the appended claims are intended to cover all variations and adaptations within the true scope and spirit of this invention.

What is claimed as new and is desired to be secured by Letters Patent of the United States is:

1. In a power-operated punch of the kind adapted to punch holes in a light transmitting workpiece and having a predetermined hole pattern imprinted thereon and including a ram member having a cutting head portion, a die member disposed adjacent said ram member and separated a predetermined distance from said cutting head, said die member having walls defining a passage therethrough, said passage having a first end and a second end, said first end being aligned to receive said cutting head and contoured to provide a close fit therewith, said cutting head and said passage being substantially coaxial, and means for reciprocally moving said cutting head into said passage through said first end thereof; the improvement comprising, in combination:

(A) a body member coupled to said die member and having walls defining a cavity positioned adjacent said second end of said passage and adapted to receive and discharge the portions of the workpiece removed by said cutting head;

(B) a light source positioned in said cavity out of alignment with said passage and oriented to reflect light from said walls and concentrate the light to direct a beam of light through said passage to form a spot of light on said workpiece at the position corresponding to the path of said cutting head, whereby said workpiece can be adjusted until the spot of light is coincident with one of the hole positions indicated on said hole pattern; and (C) a striper adjustably mounted between said cutting head and said die member and having a transparent portion positioned in contiguous spaced relation to said die member, said transparent portion having a clearance opening in alignment with said passage for movement of said cutting head therethrough.

2. In a power-operated punch of the kind adapted to punch holes in electromagnetic radiation transmitting work stock and having a ram member comprising a cutting head, a die member disposed adjacent said ram member and separated a predetermined distance from said cutting head, said die member having walls defining a passage therethrough and said passage having a first end and a second end and said first end aligned to receive said cutting head and contoured to provide a close fit therewith and said cutting head and said passage substantially coaxial, the improvement comprising, in combination:

(A) means for reciprocally moving said cutting head into said passage through said first end thereof;

(B) a source of electromagnetic radiation oriented to concentrate and direct a beam of electromagnetic radiation through said passage from said second end thereof; and (C) a stripper adjustably mounted between said cutting head and said die member and having a transparent portion positioned in contiguous spaced relation to said die member, said transparent portion having a clearance opening in alignment with said passage for movement of said cutting head therethrough.

References Cited by the Examiner

UNITED STATES PATENTS

| | | | |
|---|---|---|---|
| 1,396,895 | 11/21 | Stolz | 83—520 |
| 1,646,851 | 10/27 | Campbell | 83—146 |
| 2,440,950 | 5/48 | Hill | 83—520 |
| 2,613,744 | 10/52 | Hillmer | 83—520 |
| 2,703,143 | 3/55 | Good et al. | 83—685 |

FOREIGN PATENTS

| | | |
|---|---|---|
| 381,360 | 10/32 | Great Britain. |

WILLIAM W. DWYER, Jr., *Primary Examiner.*

CARL TOMLIN, HUNTER C. BOURNE, Jr., ANDREW R. JUHASZ, *Examiners.*